UNITED STATES PATENT OFFICE.

EDWARD S. CHAPIN, OF NEW YORK, N. Y.

SULFUR DYE AND PROCESS OF MAKING SAME.

No. 909,152.

Specification of Letters Patent.

Patented Jan. 12, 1909.

Application filed February 20, 1906. Serial No. 301,980. (Specimens.)

*To all whom it may concern:*

Be it known that I, EDWARD S. CHAPIN, a citizen of the United States, residing in the borough of Brooklyn, city and State of New York, have invented a new and useful Improvement in Sulfur Colors and Process of Making the Same, of which the following is a specification.

My invention consists in heating a non-crystallizable polysaccharid with an aromatic chemical and sulfuring substances until a dyestuff is produced.

I have discovered that by heating to a proper degree of temperature and for a sufficient length of time a non-crystallizable polysaccharid (Tollens *"Kohlenhydrate"*, Breslau 1895, Vol. II, pp. 197–276) with an aromatic chemical and sulfuring substances, a valuable dyestuff is produced, which will dye cotton directly in a salt bath with the assistance of sodium sulfid or sal soda.

I may use an aromatic chemical which in itself is a color-former, and find, in such a case, that the resulting substance and shade are different from those resulting from the sulfuring of the aromatic chemical alone, or of the non-crystallizable polysaccharid alone, or of the mixture of the separately sulfured substances. Here the non-crystallizable polysaccharids may be said to play the part of co-bases. I may also use an aromatic chemical which in itself is not a color-former and when sulfured alone under similar circumstances produces no coloring matter, and find in some such cases that the resulting substance and shade are different from those resulting from the sulfuring of the non-crystallizable polysaccharid alone. This seems to indicate that color-forming properties have been imparted to the non-color-forming aromatic chemical by the non-crystallizable polysaccharid. The influence of increments of heat furthermore in connection with many of these co-basis colors, for example with the colors obtainable from wheat starch and metaphenylene diamin, is characteristically novel. While with the coloring matters produced from the non-crystallizable polysaccharids alone the higher the temperature at which the standard cotton colors can be made the blacker the result; and with the colors produced from aromatic bases alone the lowest temperatures possible for the sake of beauty of shade, usually below 175–150° C. are now sought (see Bots, *Textile Colorist* 1904, No. 307, p. 200); with many of the co-basis colors and in particular with the example cited, the higher the temperature below 300° C. the brighter and the richer are the colors that are thereby obtained.

The coloring matters obtained are characterized by their fastness: they are fairly fast to light, but much faster to fulling, alkalies and acids. When these coloring matters are after-treated with bichromate of potash, chromium fluorid, or blue stone, the shades are dulled, but the fastness of the results is much increased. The same or even greater fastness of the coloring matters may be secured by including in the original melts as an ingredient blue stone: in this case the shades of the resultant coloring matters are unaltered, and the direct dyeings possess all the very excellent fastness of after-treated dyeings.

The following examples may serve to show the manner in which coloring matters may be produced by sulfuring various non-crystallizable polysaccharids in combination with various color-forming aromatic chemicals.

*Example I. Wheat starch and metaphenylene diamin.*—Into a suitable crucible weigh 60 grams of sodium sulfid crystals, and 15 grams of sulfur. Add 200 c. c. of water and boil for five minutes. Then add 10 grams of wheat starch worked up into a thin paste in 50 c. c. of water. Then add 6 grams of metaphenylene diamin. Boil slowly until the water has evaporated. Then raise the temperature in one half an hour gradually to 300° C. Continue heating at 300° C. for another half hour. Stir frequently in order to bring about a complete reaction throughout the mass. In heating and stirring great care must be taken to prevent burning. In case the full tinctorial power or the richest shade of the coloring matter has not been developed, heat another half hour at 300° C. The coloring matter thus formed is readily soluble in cold water, or in cold alcohol, to a bright brown solution; it is readily soluble in cold caustic soda or carbonate of soda solutions. It dyes cotton a fast cutch brown shade in a salt bath with the assistance of sodium sulfid or sal soda.

The coloring principle can be obtained in a purer and more concentrated form by precipitating with acids in the well-known manner; the coloring matter thus obtained is insoluble in water, or in cold alcohol, soluble in a solution of sodium sulfid to a bright cutch brown shade, and dyes cotton direct from a salt bath with the assistance of sal soda and sodium sulfid fast cutch brown shades.

If in the above formula the metaphenylene diamin is increased to 12 grams a much brighter brown will be produced, while if the amount be decreased to 3 grams a duller brown will be produced.

The coloring matters obtained are of a good relative degree of fastness to light, and of an excellent relative degree of fastness to fulling, alkalies and acids. Faster coloring matters can be obtained by after-treating with metallic salts, as bichromate of potash, chromium fluorid, or blue stone. The dyeings after-treated with bluestone are especially fast to light. 3 grams of blue stone may be included in the original melt. The shades of the resulting coloring matters are uninfluenced by the presence of the metallic component of the melt, and the fastness towards agents becomes generally excellent.

*Example II. Cornstarch and metaphenylene diamin.*—For wheat starch in Example I substitute corn starch. The resulting coloring matter is substantially identical with that of Example I.

*Example III. Potato starch and metaphenylene diamin.*—For wheat starch in Example I substitute potato starch. The resulting coloring matter is substantially identical with that of Example I.

*Example IV. Gum arabic and metaphenylene diamin.*—For wheat starch in Example I substitute gum arabic and use more water at the start. The resulting coloring matter is substantially identical with that of Example I.

*Example V. Wood sawdust and metaphenylene diamin.*—Into a suitable crucible weigh out 60 grams of sodium sulfid crystals and 15 grams of sulfur. Boil up to dissolve the sulfur. Then add 10 grams of wood sawdust and 6 grams of metaphenylene diamin. Boil one hour to impregnate the sawdust thoroughly with the sulfuring agents. Then raise the temperature slowly to 320° C. covering the crucible, to prevent the burning of the contents. Heat at 320° C. for one hour or until the full strength of the color has been developed.

The coloring matter obtained is readily soluble in cold water, cold alcohol, cold alkaline and cold sodium sulfid solutions to a dull cutch brown solution and dyes cotton direct in a salt bath, fast, dull cutch brown shades, with the assistance of sodium sulfid or sal soda.

The coloring principle can be obtained in a purer and more concentrated form by precipitating with acids in the well-known manner: the coloring matter obtained is insoluble in water and alcohol, soluble in a solution of sodium sulfid to a dull cutch brown shade, and dyes cotton direct in a salt bath with the assistance of alkali and sodium sulfid fast dull cutch brown shades.

*Example VI. Noncrystallizable polysaccharid and metanitranilin.*—Substitute metanitranilin, gram for gram, for metaphenylene diamin in Examples I, II, III and IV. The resultant products will be similar in characteristics to those obtained by the use of metaphenylene diamin, though generally rather poorer relatively, in strength and shade.

*Example VII. Noncrystallizable polysaccharids and metadinitrobenzene.*—For metaphenylene diamin in Examples I, II, III and IV substitute gram for gram, metadinitrobenzene. The resulting coloring matters are similar in fastness and other characteristics to those obtained by the use of metaphenylene diamin, but the shades are darker, slightly so with the starches, and decidedly so with wood sawdust.

I have made many other experiments with my new process. Thus from binitrochlorbenzol and cornstarch I have obtained a dark brown of a somewhat yellowish cast, the color being darker or lighter as less or more of the aromatic chemical is used. With salicylic acid and cornstarch I have obtained a dark reddish brown; and with picric acid and cornstarch a medium light brown. Paranitrophenol and potato starch give an olive; dinitronaphthalene and cornstarch a medium dull blue black; dinitrophenol and potato starch a greenish black.

The following examples will serve to illustrate the manner in which coloring matters may be produced from the non-crystallizable polysaccharids in combination with non-color-forming aromatic chemicals.

*Example VIII. Wheat starch and sodium salt of sulfanilic acid.*—Weigh into a crucible 60 grams of sodium sulfid crystals and 15 grams of sulfur, and 10 grams of wheat starch. Melt and heat for 1 hour at 120° C. Add 6 grams of the sodium salt of sulfanilic acid. Heat at 120–140° C. until the color forms; then raise the temperature to 200° and heat for an hour more.

The color formed is a medium, not dark, reddish brown. It is soluble in cold water and cold alcohol, in cold alkaline and cold sodium sulfid solutions to a medium brown solution, and dyes cotton direct from a salt bath with the assistance of sal soda or sodium sulfid fast medium brown not dark shades.

With corn or potato starch the results are similar.

*Example IX. Starch and sulfanilic*

*acid.*—By substituting sulfanilic acid for the sodium salt of sulfanilic acid, in Example VIII, similar results will be obtained.

Without the addition of the starch in the above examples, no dyestuffs would be produced by the process given, while with the starch alone a dark brown would be obtained.

I claim:

1. The process for the production of sulfur dyes which consists in heating a non-crystallizable polysaccharid with an aromatic chemical and sulfuring substances.

2. The process for the production of sulfur dyes which consists in heating a non-crystallizable polysaccharid with a color-forming aromatic chemical and sulfuring substances.

3. The process for the production of sulfur dyes which consists in heating a non-crystallizable polysaccharid with a color-forming aromatic chemical, sulfur and sodium sulfid, substantially as described.

4. The process for the production of sulfur dyes which consists in heating a starch with an aromatic chemical and sulfuring substances.

5. The process for the production of sulfur substances which consists in heating a starch with a color-forming aromatic chemical and sulfuring substances.

6. The process for the production of sulfur dyes which consists in heating wheat starch with an aromatic chemical and sulfuring substances.

7. The process for the production of sulfur dyes which consists in heating wheat starch with a color-forming aromatic chemical and sulfuring substances.

8. The process for the production of sulfur dyes which consists in heating wheat starch and metaphenylene diamin with sulfuring substances.

9. The process for the production of sulfur dyes which consists in heating wheat starch, metaphenylene diamin, sulfur and sodium sulfid, substantially as described.

10. As a new article of manufacture, the brown coloring matter which can be made from wheat starch, and metaphenylene diamin, substantially as described, which is soluble in cold water, or in cold alcohol, to a bright brown solution, is readily soluble in cold caustic soda or carbonate of soda solutions, and which dyes cotton a fast cutch brown shade in a salt bath with the assistance of sodium sulfid or sal soda, and which, when precipitated by an acid forms a brown coloring matter which is insoluble in water, or in cold alcohol, soluble in a solution of sodium sulfid to a bright cutch brown shade, and dyes cotton directly from a salt bath with the assistance of sal soda, and sodium sulfid fast cutch brown shades.

In testimony whereof, I have hereunto signed my name in the presence of two subscribing witnesses.

EDWARD S. CHAPIN.

Witnesses:
FRITZ V. BRIESEN,
JOHN A. KEHLENBECK.